Oct. 22, 1935.     F. P. DAHLSTROM     2,018,055

BEARING CONSTRUCTION FOR ROLLING MILLS AND THE LIKE

Filed Aug. 7, 1931     2 Sheets-Sheet 1

Inventor
Frank P. Dahlstrom
By Geo. H. Kennedy Jr.
Attorney

Oct. 22, 1935.   F. P. DAHLSTROM   2,018,055
BEARING CONSTRUCTION FOR ROLLING MILLS AND THE LIKE
Filed Aug. 7, 1931   2 Sheets-Sheet 2
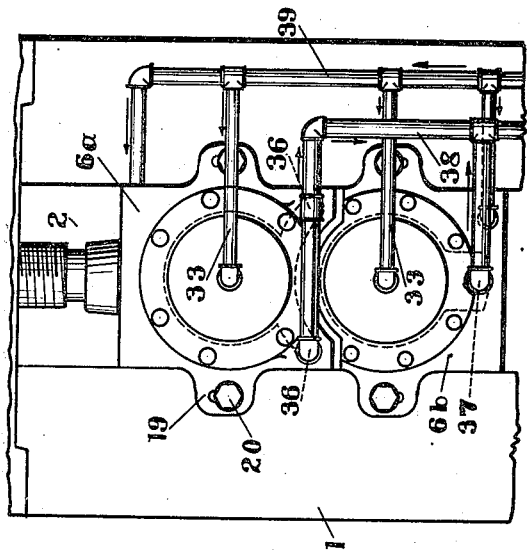
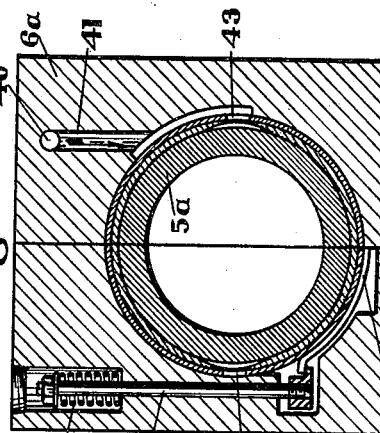
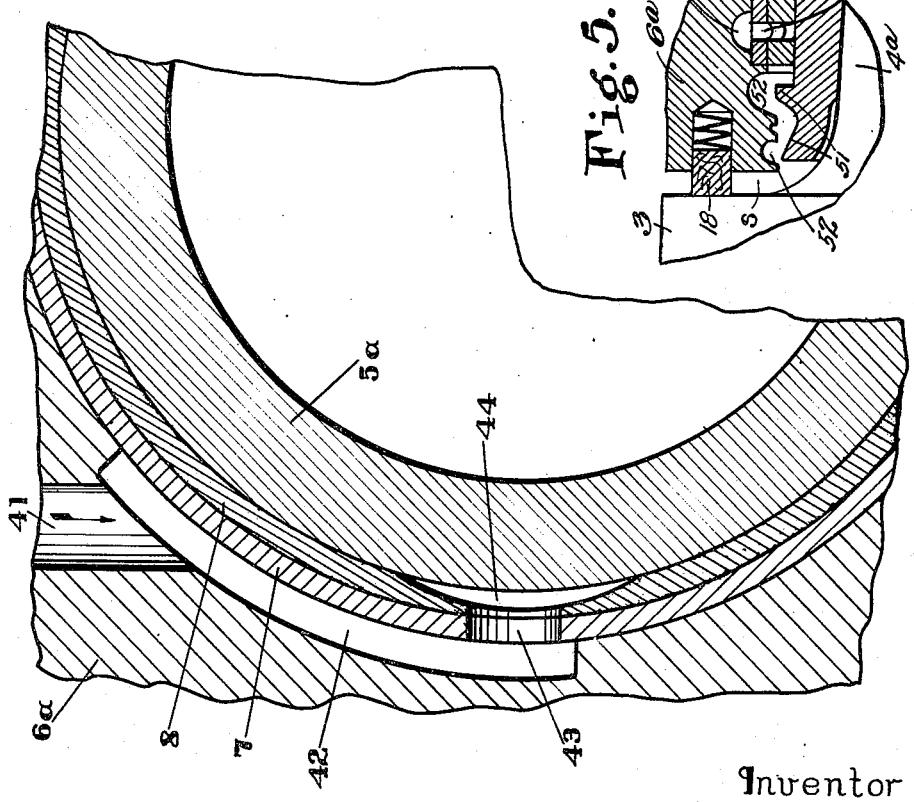
Inventor
Frank P. Dahlstrom
By Geo. H. Kennedy
Attorney Patented Oct. 22, 1935

2,018,055

UNITED STATES PATENT OFFICE 2,018,055

BEARING CONSTRUCTION FOR ROLLING MILLS AND THE LIKE

Frank P. Dahlstrom, Worcester, Mass., assignor to Morgan Construction Company, Worcester, Mass., a corporation of Massachusetts Application August 7, 1931, Serial No. 555,758

9 Claims. (Cl. 308—70)

The present invention relates in general to bearings, and more particularly to a bearing construction adapted for heavy duty and high speed work such as is required, for example, of the neck bearings for rolling mill rolls.

The ordinary plain bearings (as distinguished from anti-friction ball or roller bearings) heretofore in common use for journalling the necks of rolling mill rolls are not only subject to very rapid wear but have a very high coefficient of friction, due to the fact that such plain bearings, in most instances, are of crude design, consisting simply of an open concave babbitted seat embracing somewhat less than half of the roll neck circumference; such bearings, whose lubrication in most cases depends on the periodic application of heavy grease to the roll neck surface, are exposed at all times to the access of scale and water from the rolling operation, and this makes it practically impossible to maintain a lubricant film between the bearing surfaces in running contact. Anti-friction ball or roller bearings for roll necks, while overcoming the lubrication difficulties encountered with ordinary plain bearings, are always under a very serious handicap imposed by the extremely limited space that exists between the necks of a pair of cooperating rolls:—namely, that this space must accommodate not only the thickness, measured radially, of both sets of the balls or rollers, but also the thickness, measured radially, of their inner and outer raceways and of the two bearing cases or boxes as well; consequently, the use of anti-friction bearings in this environment necessitates such a material reduction in the diameter of each roll neck, for rolls of given size, that breakage of rolls so journalled, at the necks thereof, is a frequent occurrence; furthermore, such anti-friction bearings cannot withstand the heavy pressures of rolling operations, when the reducing rolls run at high speeds.

According to the present invention, many of the difficulties heretofore encountered in the use of both plain bearings and roller or other anti-friction bearings, for the journalling of rolling mill roll necks, are entirely overcome,—by a bearing construction which combines the advantages of both of these types, and avoids their disadvantages. Other and further objects and advantages of the invention will appear from the following detailed description thereof, taken in connection with the accompanying drawings, in which:—

Fig. 2 is a fragmentary smaller scale view in end elevation of the construction shown in Fig. 1.

Fig. 3 is a transverse sectional view partly on the line 3—3 and partly on the line 3a—3a of Fig. 1.

Fig. 4 is a fragmentary large scale transverse sectional view illustrating the access of lubricant to the bearing surfaces.

Fig. 5 is a fragmentary sectional view illustrating on a larger scale than Fig. 1 the construction of certain oil-retaining features of my improved bearing.

Like reference characters refer to like parts in the different figures.

Figure 1:
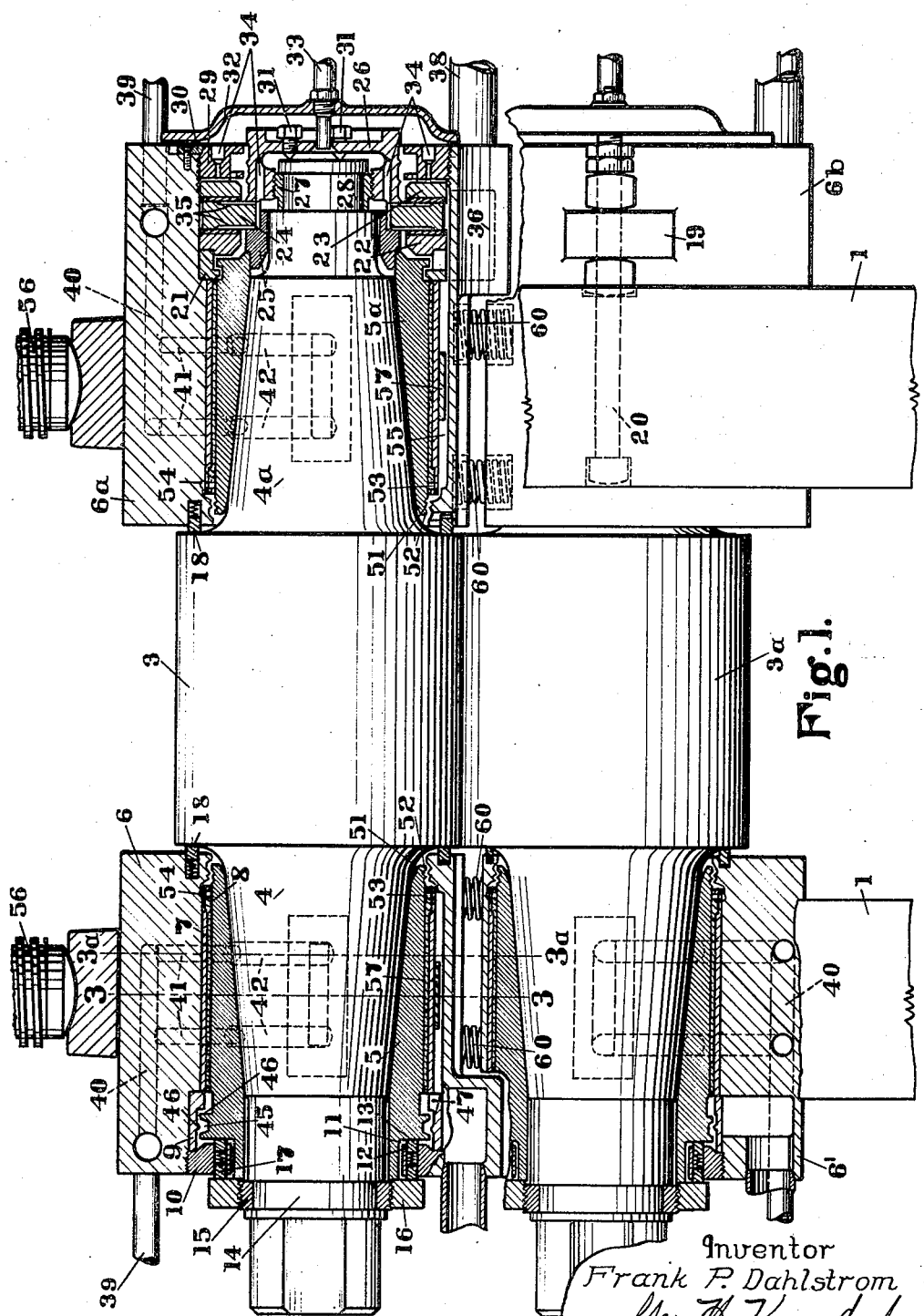
Fig. 1 is a view in side or front elevation, partly in section, of a rolling mill housing and rolls having my invention applied thereto.

The ordinary plain bearing for a roll neck consists essentially of a member, suitably mounted in the roll housing, and providing a concave seat with which the revolving neck makes direct contact. Because of the open character of such a bearing, the access of scale and water from the rolling operation to the surfaces in running contact is usually so great that effective lubrication is impossible. Furthermore, the fact that the roll neck itself serves as one of the contacting bearing surfaces, requires, if said surfaces are to be maintained in good running condition, the frequent entire dismantling of the roll housing, for the removal therefrom of the rolls to permit resurfacing of their necks. This refinishing of roll necks thus requires as complete a shut-down of the mill as that required for refinishing or re-grinding the roll barrels.

The present invention contemplates a radical departure from the ordinary use of mill rolls having plain bearings, in that no refinishing of the roll necks is ever required. According to the invention, the roll neck surface is entirely relieved of any wear, since the bearing contact is between the surfaces of outer and inner members, the latter running within the former, and the two forming the principal parts, as hereinafter described, of a bearing assembly which, as a unit, is applicable to and removable from, the roll neck. In such unit plain-bearing assembly, the running clearance space between the outer and inner members is oil-flooded, and the oil film is so maintained that there is no metal-to-metal contact even under the heaviest loading; such space, except for the ingress and egress of the oil that circulates therethrough, is completely inclosed, not only in the mounted, but also in the dismounted position of said bearing assembly, and in the mounted position of said assembly, said space is effectually sealed, so as to prevent the entrance of any water, scale or other foreign matter from the rolling operation. In consequence, the bearing always has a much lower coefficient of friction than the ordinary plain bearings heretofore commonly used on roll necks.

Referring now to the drawings for an illustrative embodiment of my invention, the rolling mill housing is of conventional form, providing opposite upright sides 1, 1, Fig. 1, each of which has the usual opening or window 2, Fig. 2, for the reception of the stationarily mounted outer members of the aforesaid bearing assemblies for the necks of the upper and lower rolls. Said rolls, designated, respectively, 3 and 3a in Fig. 1, have body or barrel portions of conventional design, but the reduced necks of each roll, instead of being of the usual uniform diameter, are preferably tapered, as shown at 4 and 4a in Fig. 1, neck 4a beyond its tapered portion being of somewhat different construction from the neck 4 on account of the provision, as hereinafter described, of a thrust bearing for the roll at this end. This tapering of each roll neck 4 or 4a facilitates the application telescopically thereto of its bearing assembly, the latter in each instance including an inner member or sleeve 5 or 5a, which is internally tapered to correspond to the roll neck taper and which presents an outer cylindrical surface having a running fit in the bore of the associated stationary member of said assembly.

As shown at the left hand side of Fig. 1, the unit bearing assembly constituted in part by the sleeve 5 has its outer or stationary member in the form of a block 6, which fits the opening or window 2 of the housing 1 and provides interiorly in surrounding relation to the sleeve 5, the liner 7, preferably of brass and presenting interiorly a babbitted surface 8 within which the sleeve 5 has a relatively close turning fit. The liner 7, 8 is held endwise in the bore of block 6 by an annular member 9 bearing against its outer end, said member 9 being retained by an annular nut 10 which is threaded into said bore following the insertion of the rotary sleeve 5 in said bearing assembly. For the accommodation of the retaining nut 10, the outer end of sleeve 5 beyond the interior tapered portion that closely engages the neck 4, is cut away or reduced in diameter as shown at 11; the nut 10 carries on its inner side a spring pressed packing ring 12 adapted to bear against the opposing shoulder 13 of the sleeve 5 as the latter rotates within the box 6, thus to seal the interior of the bearing near its outer end, whereby oil from the flooded bearing which gets past the devices, hereinafter described, for intercepting the same, is effectually prevented from discharging in undue quantity from the end of the assembly.

The above described bearing construction, wherein the stationary block 6 has rotatably mounted therein the sleeve 5, is applicable as an assembled unit to the roll neck 4, and is likewise removable from said roll neck as an assembled unit. That is to say, when such bearing assembly as a unit is applied endwise to the neck 4, the tapered interior of its sleeve 5 engages the correspondingly tapered surface of the neck, and these tapered surfaces are then forced into such intimate contact that the sleeve 5, either with or without the use of a key (not shown), becomes virtually integral with the neck. This union is secured by endwise pressure exerted inwardly on the sleeve 5; for this purpose the roll neck 4 at its outer end has a groove 14 to which is applied, after the bearing assembly is in place, a two-part exteriorly threaded ring 15. Then, an interiorly threaded member 16 is screwed inwardly on the ring 15 to engage the outer end of sleeve 5 and to force said sleeve tightly onto the tapered surface of roll neck 4. The stationary annular nut 10 on its outer surface carries a spring pressed ring 17 bearing against the inner surface of the rotating member 16, thus to seal the outer end of the bearing assembly and to effectually exclude any entrance at this end of water and scale from the rolling operation.

The outer member or stationary block 6 of the bearing assembly so applied as a unit to the roll neck carries at its inner end a suitable spring pressed packing ring 18 which bears against the end of the roll barrel, at the shoulder between the latter and its neck 4; in this way the water and scale from the rolling operation is effectually excluded at the inner end of the bearing from access to the interior of the bearing assembly and from the surfaces of sleeve 5 and liner 7, 8 in running contact. The bearing assembly, when applied to a roll neck 4, as above described, has its stationary member or block 6 snugly received in the housing window 2, and said block 6 provides the usual lugs 19 on opposite sides for the passage of retaining bolts 20 that hold each bearing securely to the housing side 1.

The bearing assembly for the roll neck 4a, shown at the right hand side of Fig. 1, is similar in construction to that above described, except that provision is made for resisting end thrust exerted during the rolling operation. The inner member or sleeve 5a of this bearing makes the same taper fit with the roll neck 4a, and the outer member or stationary block 6a of this bearing provides the same liner 7, 8, for the running therein of sleeve 5a. In this case, the liner is positioned and held in place by an annular member 21, interposed between said liner and an annular wear plate 22 received within the bore of box 6a. An opposing companion wear plate 23 is likewise received in said bore, and between these two stationary wear plates is arranged a ring member 24 that is carried by and turns with the neck 4a and sleeve 5a. That is to say, said member 24 is so arranged that its inner portion transmits to a bushing 25, abutting the outer end of sleeve 5a, the pressure of the nut 26 (corresponding to the member 16 of the left-hand bearing assembly) that is used to force the sleeve 5a onto the neck 4a. The threads of said nut 26 engage those of a two-part collar 27 that is applied to the groove 28 of the roll neck, after the bearing assembly is in place.

The opposite faces of member 24, turning with the neck 4a, are contacted by the stationary wear plates 22 and 23 that are held in the bore of block 6a by a ring 29, the latter being screwed into said bore, and affording thereby an adjustment of the thrust bearing provided by the wear plates 22, 23 and the member 24. Any suitable means, such as a toothed member 30 may be used to lock the ring 29 in the desired position of adjustment. Also, to prevent the retaining nut 26 from loosening on the neck 4a, suitable locking screws 31, 31 may be provided, to engage the end of said neck. The outer end of this bearing assembly, when in place on the neck 4a within the housing window 2, is covered by a plate 32, suitably secured to the outer end of block 6a.

This end plate 32 serves as a tight closure against the escape of oil from the bearing assembly, such oil, for the lubrication of the thrust bearing 22, 23, 24 being introduced by a pipe 33 that projects inwardly through the plate 32 and nut 26. Said oil fills substantially all the spaces in the outer end of the bearing assembly and it reaches the wear surfaces of the thrust bearing through suitable apertures 34, 34 in nut 26 and also in ring 29, being thrown outwardly toward said surfaces by the rotation of said nut. Suitable grooves 35, 35 on the flat faces of the rotary member 24 may be provided to conduct the oil between said faces and the opposing faces of the wear plates 22 and 23, thus securing adequate lubrication of the thrust bearing. This oil then drains into suitable interior channels 36, 36 of the box 6a for the upper roll bearing, or into a similar channel 37 of the block 6b of the lower roll bearing, and is conducted away through suitable piping 38, Fig. 2, connected to said channels.

As also shown in Fig. 2, the oil supply pipe 39 having branches 33, 33 to the thrust bearings as above described, may also supply the lubricant for the maintenance of an oil film between each rotating sleeve 5a and the bearing liner 7, 8 of the block 6a. The maintenance of such oil film is obtained, for each of the several bearing assemblies, in the same manner, viz., by the provision in each of the stationary blocks 6, 6', 6a and 6b of suitable oil passages 40, 40, supplied by the two pipes 39, 39 and having a plurality of vertical branches 41, 41 each of which communicates with a recess 42 (Fig. 4) in the bore of the block, behind the liner 7, 8. An appreciable gap or parting in the latter, as shown at 43 in Fig. 4, provides for the free flow of the oil into a longitudinaly extending wedge-shaped recess 44 formed in the inner babbitted surface 8 of said liner. The oil thus supplied is spread, by the rotation of the sleeve 5 or 5a, as the case may be, over the entire area of contact between said sleeve and the liner, it being understood that, the faster the rotation of said sleeve, the greater will be the quantity of oil carried into the working clearance space between the sleeve and the liner, thus to maintain the desired oil film between said parts under the most trying conditions of operation.

The oil that thus floods the clearance space between each liner 7, 8 and the associated rotary sleeve 5 or 5a has constant egress, in the operation of the bearing, from the ends of the inclosed bearing surfaces of said parts, thus insuring a constant circulation. Such oil, in the case of the bearing assemblies at the left hand side of Fig. 1, has its outward passage intercepted by suitable throw-off flanges 46 and cooperating grooves 45 provided for this purpose by the sleeve 5 and annular member 9, these serving to deflect said oil, or the bulk of it, through the apertures 47, 47 of said member 9, into the return channels 36, 37, respectively, of the blocks 6 and 6'. Any oil that gets past said intercepting devices is prevented from escaping in undue quantity by the packings 12. Near their inner ends the liners 7, 8, for the bearings of both necks of a roll, have a ring of apertures 53, 53 communicating with a groove 54 that connects, through space 55 beneath the liner, with the oil-return channels 36 or 37 as the case may be; any of the oil that squeezed out at the inner end of the inclosed bearing surfaces that gets past the apertures 53 is intercepted by the throw-off flange 51 of the rotary sleeve and deflected into the groove 52 of the stationary block, said groove leading to the space 55 below each liner that connects with the return channels 36 and 37.

It is to be noted that the above-described construction keeps practically independent of each other the function of retaining the lubricant and the function of excluding the water and scale. The efficacy of the ring 18 as a device for excluding water and scale is very materially contributed to by its position in a plane perpendicular to the axis of rotation of the roll and by its circumferential location at a considerable distance from said axis, where the centrifugal force, due to the rotation of the roll, is most effective in throwing the water outwardly. Centrifugal force would also militate severely against this same ring 18 serving simultaneously as an oil seal, if any appreciable amount of oil from the bearing were allowed to reach the annular space s, Fig. 5, at the inner end of the bearing adjacent the end of the roll barrel. The throw-off flanges 51 and their cooperating grooves 52 eliminate this difficulty by intercepting and throwing off the oil before it can reach this space s, and while it is on a circumference smaller than ring 18 and therefore not acted on as powerfully by centrifugal force as it would be if it reached this space. This independence of the functions of water exclusion and oil retention, so that the oil is prevented from passing to the ring 18, is an important factor in the successful operation of the gearing, because it insures at all times the unimpaired maintenance of the oil film on the bearing surfaces of the sleeves 5 and 5a and the liners 7, 8.

In the operation of mill rolls having bearings of the construction above described, the holding-down pressure for the upper roll 3 is exerted in the usual manner by screws 56, 56 mounted in the housing sides 1, 1 and bearing against the upper blocks 6 and 6a. The weight of said upper roll 3 is transmitted to said blocks 6, 6a by straps 57, 57 which underlie the lower half of each of the liners 7, 7, the ends of said strap, as shown in Fig. 3, being suspended from rods 58, 58 having resilient mountings, as shown at 59, in the blocks 6 and 6a. The upper blocks 6 and 6a may be supported on the lower blocks 6' and 6b respectively, by means of springs 60, 60 these serving to hold the rolls 3 and 3a apart, and preventing any undue jump of the upper roll upon the entry of the material between said rolls.

As distinguished from the ordinary plain bearings heretofore used in the journalling of rolling mill roll necks, the present invention provides a construction which avoids the necessity for ever performing any refinishing operations on the roll necks themselves. In this construction, involving a plain bearing assembly applicable as a unit to the roll neck, the contacting bearing surfaces are completely inclosed, this effectually protecting said surfaces from any access of scale and water and making possible the constant maintenance of an oil film between said surfaces; the oil does not need to be forced in under high pressure between said surfaces, it being necessary only to supply the oil in sufficient quantities to keep the recesses 42 filled at all times, so that there is ample replenishment of the oil being pulled or drawn through the bearing by the rotation of the sleeve 5 or 5a in its liner 7, 8. The invention, as thus described, actually provides, in a plain bearing, all the running anti-friction conditions obtained with ball or roller bearings; in fact, the running coefficient of friction in the plain bearing of my invention is almost identical with that of a ball or roller bearing. The invention furthermore provides a bearing of maximum capacity in the available space, while maintaining a large diameter for the roll neck in the zone, adjacent the roll barrel, where said neck is subjected to the greatest breaking strain. Obviously, if the rolls 3 and 3a of Fig. 1 were journalled in ball or roller bearings, it would be necessary, for the accommodation of said balls or rollers and their raceways, to make the roll necks much smaller in this zone of greatest strain; this would result in frequent roll neck breakages under the loads encountered in rolling mill practice. Furthermore, it is a well known fact that the higher the operating speed of an anti-friction ball or roller bearing, the less will be its capacity for load. On the other hand, with the adequately lubricated plain or sleeve bearing, such as provided by my invention, the capacity for load increases with the speed, due to the fact that the rotary element carries and forces more oil through the bearing clearances as the speed is increased.

In case of wear on the bearing surfaces, the bearing assembly as a unit may be withdrawn from the roll neck by unscrewing the retaining member (16 or 26), removing the split ring, and pulling the assembly off the roll neck; a replacement assembly can then quickly be put in place on the roll neck and drawn up tight by the retaining member, permitting the mill to resume its operation with the least possible delay. The withdrawn bearing assembly can be reconditioned by relining, or the like, as a machine shop operation. In no case is it ever necessary to dismount the reducing rolls for purposes of bearing repair or replacement, since no wear ever takes place on the necks of said rolls.

I claim,

1. A bearing construction for rolling mill roll necks, comprising an inner member fitted to and rotating with the neck and a surrounding outer casing or chock, the latter having a bore which provides for said inner member a sliding, plain, or oil-film bearing whose diameter, owing to the negligible space required by the oil film, can be large enough to allow the neck in its zone of maximum breaking stress to have a diameter not materially reduced from the neck diameter normally required by the size of the barrel portion of the roll, when said bearing construction occupies the limited space available for its reception between the necks of adjacent cooperating rolls.

2. A roll neck bearing of the class described having wholly inclosed oil-flooded bearing surfaces, the latter being provided by an inner member fitted to and rotating with the roll neck and by a surrounding outer casing member having a bore, the latter directly receiving said inner member and providing for the same a sliding or plain bearing journal whose diameter, on account of the minimum space required by the oil film, can be close enough to that of the roll barrel to allow the neck diameter, notwithstanding the space occupied by said inner member, to be maintained in normal proportion to said roll barrel diameter.

3. A roll neck bearing in unit-assembly form and providing bearing surfaces which in both the mounted and demounted positions of said assembly are wholly inclosed thereby, said bearing comprising an inner member adapted to fit upon and to rotate with the roll neck and a surrounding outer casing or chock having a bore, the latter containing said inner member and providing for the same a sliding, plain, or oil-film bearing, whose diameter, because of the negligible space occupied by the oil film, can be large enough to allow the neck, in its zone of maximum breaking stress, to have a diameter substantially unreduced from that required to make said neck commensurate in strength with the barrel portion of the roll.

4. A bearing construction applicable as a unit-assembly to the neck of a rolling mill roll, and comprising an outer casing or chock having a bore and an inner member fitted to and rotating with the roll neck and having in said bore a sliding or plain oil-lubricated bearing, whose diameter, on account of the minimum space required by the oil, can be large enough to allow the neck, in its zone of maximum breaking stress, to have a diameter not materially less than the neck diameter normally required, in any given roll, by the roll barrel diameter, when said members occupy the limited space available for bearing reception between the necks of adjacent cooperating rolls.

5. A bearing construction for rolling mill roll necks, comprising an inner member fitted to and rotating with the neck and a surrounding casing member, the latter at its inner end making a running joint with the end of the roll barrel, said casing member having a bore which provides for said inner member a sliding or plain bearing joint, but which can be large enough to allow the neck, in its zone of maximum breaking stress, to have a diameter substantially unreduced from that normally required by the roll barrel diameter, when said bearing construction occupies the limited space available for it between the necks of adjacent cooperating rolls.

6. A roll neck bearing of the class described having wholly inclosed oil-flooded plain bearing surfaces and comprising an inner member fitted to and rotating with the roll neck and a surrounding outer casing receiving and journalling said inner member, means operative between said casing and the end of the roll barrel to provide a running joint for excluding the water and scale of the rolling operation from said bearing surfaces, the latter being on a diameter smaller than said running joint, but which, owing to the negligible space occupied by the oil film, can be large enough to allow the neck, in its zone of maximum breaking stress, to have a diameter substantially unreduced from that required to make said neck commensurate in strength with the barrel portion of the roll, when said bearing occupies the limited space available for its reception between the necks of adjacent cooperating rolls.

7. A bearing construction for rolling mill roll necks, comprising an outer casing member having a bore, and an inner member fitted to and rotating with the roll neck and having in said bore a sliding or plain bearing journal, whose diameter, on account of the absence of any appreciable spacing between said members, can be large enough to allow the neck, in its zone of maximum breaking stress, to have a diameter not materially less than that normally required by the roll barrel diameter, when said members occupy the limited space for bearing reception between the necks of adjacent cooperating rolls, means operating on a larger diameter than said journal to exclude from its bearing surfaces the water and scale from the rolling operation, and means operating on a smaller diameter than said last-named means for preventing the passage to said last-named means of lubricant discharged from said bearing surfaces.

8. The combination with a rolling mill roll having its reduced neck portion tapered, of a bearing for said neck portion applicable as a unit assembly thereto, and comprising a sleeve adapted to rotate with said neck portion and having an internal taper corresponding to the taper of said neck portion, thereby to facilitate the application of the bearing to said neck as a unit assembly, the latter also comprising a surrounding outer casing having a bore which contains said sleeve and provides for same an untapered sliding or plain bearing journal, whose diameter, owing to absence of appreciable spacing between said sleeve and casing, can be great enough to allow the neck, in its zone of maximum breaking stress, to have a diameter not materially smaller than that required to make the roll neck commensurate in strength with the barrel portion of the roll.

9. In a bearing construction for rolling mills and the like, a sleeve member encircling the reduced end portion or neck of the roll and adapted to rotate therewith, a chock or casing completely surrounding and inclosing said sleeve member, said chock or casing having a bore which receives said sleeve member and provides therefor a sliding or plain bearing journal with relatively-running bearing surfaces wholly inclosed by and spaced inwardly from both ends of said chock or casing, means for supplying lubricant to said relatively-running bearing surfaces of said sleeve member and said bore, means for intercepting the escape of lubricant from the ends of said bearing surfaces, and means carried by said chock or casing for substantially preventing the passage to said bearing surfaces of water and scale from the rolling operation.

FRANK P. DAHLSTROM.

CERTIFICATE OF CORRECTION.

2018055

October 22, 1935.

FRANK P. DAHLSTROM.

It is hereby certified that error appears in the printed specification of the above numbered patent requiring correction as follows: Page 4, second column, line 29, claim 5, after "bearing" insert the words journal on a diameter smaller than that of said running; and that the said Letters Patent should be read with this correction therein that the same may conform to the record of the case in the Patent Office.

Signed and sealed this 26th day of November, A. D. 1935.

Leslie Frazer (Seal)

Acting Commissioner of Patents.